(12) United States Patent
Espagne et al.

(10) Patent No.: US 8,846,583 B2
(45) Date of Patent: Sep. 30, 2014

(54) BIODEGRADABLE LUBRICATING COMPOSITION AND USE THEREOF IN A DRILLING FLUID, IN PARTICULAR FOR VERY DEEP RESERVOIRS

(75) Inventors: Bernard Jean-Luc Espagne, Pau (FR); Samia Lamrani-Kern, Le Perreux sur Marne (FR); Hél éne Rodeschini, Lyons (FR)

(73) Assignee: Total Marketing Services, Puteaux (FR)

( * ) Notice: Subject to any disclaimer, the term of this patent is extended or adjusted under 35 U.S.C. 154(b) by 0 days.

(21) Appl. No.: 13/516,325

(22) PCT Filed: Dec. 14, 2010

(86) PCT No.: PCT/IB2010/055791
§ 371 (c)(1),
(2), (4) Date: Jul. 16, 2012

(87) PCT Pub. No.: WO2011/073893
PCT Pub. Date: Jun. 23, 2011

(65) Prior Publication Data
US 2012/0283151 A1    Nov. 8, 2012

(30) Foreign Application Priority Data

Dec. 15, 2009    (FR) ..................... 09 59018

(51) Int. Cl.
*C09K 8/64* (2006.01)
*C09K 8/34* (2006.01)
*C10M 169/04* (2006.01)

(52) U.S. Cl.
CPC ......... *C10M 169/04* (2013.01); *C10M 2207/20* (2013.01); *C10M 2215/042* (2013.01); *C10N 2230/02* (2013.01); *C10N 2220/023* (2013.01); *C10M 2207/126* (2013.01); *C10N 2220/10* (2013.01); *C09K 8/34* (2013.01); *C10M 2207/282* (2013.01); *C10M 2205/17* (2013.01); *C09K 8/64* (2013.01); *C10M 2203/1006* (2013.01); *C10M 2207/18* (2013.01); *C10N 2230/64* (2013.01); *C10N 2230/06* (2013.01); *C10N 2250/021* (2013.01); *C10N 2220/031* (2013.01); *C10N 2250/022* (2013.01); *C10M 2203/00* (2013.01); *C10M 2207/289* (2013.01); *C10M 2207/281* (2013.01); *C10N 2220/022* (2013.01)
USPC .......................................... 507/138; 507/265

(58) Field of Classification Search
None
See application file for complete search history.

(56) References Cited

U.S. PATENT DOCUMENTS

| | | |
|---|---|---|
| 2,816,073 A | 12/1957 | Stratton |
| 4,212,794 A | 7/1980 | Grodde et al. |
| 5,958,845 A * | 9/1999 | Van Slyke ..................... 507/103 |
| 7,071,150 B2 | 7/2006 | Genuyt et al. |
| 7,247,604 B2 | 7/2007 | Dalmazzone et al. |
| 2004/0014609 A1* | 1/2004 | Dalmazzone et al. ........ 507/200 |
| 2004/0014616 A1* | 1/2004 | Genuyt et al. ................ 508/463 |
| 2005/0020455 A1* | 1/2005 | Mapp ............................ 508/122 |
| 2008/0110799 A1* | 5/2008 | Matsui et al. ................... 208/19 |
| 2008/0248981 A1* | 10/2008 | Matsui et al. .................. 508/382 |
| 2010/0300759 A1 | 12/2010 | Passade-Boupat et al. |
| 2012/0010109 A1 | 1/2012 | Westelynck et al. |
| 2012/0028854 A1 | 2/2012 | Lamrani-Kern |

FOREIGN PATENT DOCUMENTS

| | | |
|---|---|---|
| CA | 2 006 009 | 6/1990 |
| CA | 2 006 010 | 6/1990 |
| CA | 2 047 706 | 9/1990 |
| CA | 2 148 117 | 3/1995 |
| EP | 0 652 271 | 5/1995 |

* cited by examiner

*Primary Examiner* — Susannah Chung
*Assistant Examiner* — Kumar R Bhushan
(74) *Attorney, Agent, or Firm* — Harness, Dickey & Pierce, P.L.C.

(57) ABSTRACT

The present disclosure relates to a biodegradable lubricant composition, notably intended to be incorporated as an oil phase with high lubricating power in a drilling fluid or mud. This composition may be in a drilling fluid or as a fluid for fracture of underground formations. These muds or fluids contained in the composition of the present disclosure are particularly suitable for very deep drillings, offshore in deep water and/or sidetracked drillings or with a long shift.

12 Claims, No Drawings

BIODEGRADABLE LUBRICATING COMPOSITION AND USE THEREOF IN A DRILLING FLUID, IN PARTICULAR FOR VERY DEEP RESERVOIRS

CROSS-REFERENCE TO RELATED APPLICATIONS

This application is a National Phase Entry of International Application No. PCT/IB2010/055791, filed on Dec. 14, 2010, which claims priority to French Patent Application Serial No. 09 59018, filed on Dec. 15, 2009, both of which are incorporated by reference herein.

BACKGROUND AND SUMMARY

The present invention relates to a biodegradable lubricant composition, notably intended to be incorporated as an oil phase with high lubricating power in a drilling fluid or mud. The invention also relates to the use of this composition as a continuous oil phase of a oil drilling fluid or mud as a reverse emulsion, which is particularly well suitable for deeply buried boreholes, so-called offshore holes in deep water and/or for sidetracked holes or with a long offset.

Certain sites, like extensive civil engineering work projects, require large amounts of lubricants, which are capable of being partly discharged into the environment. This is notably the case of drilling fluids and muds. The borehole occupies a primordial place in oil field development and production with a trend to increasingly deep drilling operations. The technology of drillings is in constant development, whether on land or on the seabed, in particular in what is called deep offshore, but also more recently in horizontal or sidetracked drillings, where, by successive inclinations by one or two degrees, the trajectory of the well is curved, with which horizontal offsets of at least more than one kilometer or even of more than ten kilometers relatively to the head of the well may be attained. The friction forces which are exerted are therefore increasingly large, whence the increased importance of the lubricant properties of the drilling fluid.

In a known way, the drilling technique uses a bit attached to the end of drilling rods which, driven into rotation, digs the well by crushing the rocks. As the drilling progresses, bits with increasingly small diameters are used and at each step, the well is consolidated with a steel tube called a casing, which is lowered into the inside of the hole, and then fixed by cement. During the drilling, a drilling fluid is put into circulation, with injection into the bit and expulsion of the latter in the area in contact with the rock, and then brought up to the top of the well through the annular space separating the drilling rods from the casing.

This fluid generally fulfils the following main functions:
cooling the bit,
reducing the metal-metal friction forces between the casing and the drilling rods, and the metal-rock friction forces both at the bit and in the ring-shaped area, since the fluid flows upwards, loaded with crushed rock particles so-called "cuttings" in the art,
evacuating the rock cuttings towards the outside,
generating pressure on the walls of the hole in order to prevent their collapse, and
balancing pressures between the bottom of the well and the surface, in order to keep control of the well and to avoid an explosion ("blow out").

In the case of offshore drillings in deep water, the encountered water temperatures close to 4-5° C., require good control of the viscosity of the drilling fluids at these low temperatures.

Various types of drilling fluids or muds have been used in the past, such as fluids with water, containing water and additives for increasing the viscosity, fluids with oil and emulsions of the water-in-oil type or reverse emulsions or of the oil-in-water type, as described in particular in U.S. Pat. No. 2,816,073. This document indicates that the oil phase may be formed by different hydrocarbon fractions, such as kerosene cuts and gas oils and strongly alkylated and branched petroleum cuts.

In muds with water (water base mud, abbreviated as WBM), the drilling fluid is water; muds with water are generally reserved for not very technical applications and for onshore drillings (on land), or very shallow (a few meters) offshore. In muds with oil (oil base mud abbreviated as OBM), the drilling fluid is a hydrocarbon fluid selected from various compounds available on the market.

These drilling fluids with oil are classified into three large categories:
  Group I comprises strongly aromatic drilling fluids containing from 5 to 30% of mono-aromatic and/or poly-aromatic compounds stemming from the refining of crude oils, i.e. gas oils and conventional mineral oils;
  Group II comprises moderately aromatic drilling fluids stemming from the refining of crude oil and containing from 0.5 to 5% of mono-aromatic and/or poly-aromatic compounds such as unconventional or slightly hydrotreated mineral oils often called Low Toxicity Mineral Oil (LTMO);
  Finally, Group III comprises slightly aromatic drilling fluids, i.e. containing less than 0.5% of total aromatics including less than 10 ppm of polyaromatics. These fluids generally stem from chemical synthesis or severely hydrotreated, hydrocracked or hydroisomerized refined cuts. They may also be compounds of synthetic paraffins stemming from the Fisher Tropsch process, polymerized olefins (Internal Olefins or 10, Linear Alpha Olefins or LAO, and Poly Alpha Olefins or PAO) as well as of esters.

The fluids of Group III are said to be synthetic according to the definition of the OSPAR protocol according to Ruling 2000/3 "on the Use of Organic-Phase Drilling Fluids (OPF) and the Discharge of OPF-Contaminated Cuttings"; these fluids of Group III are preferred by the operators not only for their heat stability, their resistance to oxidation, their low toxicity related to their low aromaticity, their non-irritating nature and respectful of the environment but also for their observance of safety requirements, notably by a high flash point and lesser volatility. It is known that the use of petroleum cuts (notably Groups I or II) which have high contents of aromatic compounds in drilling muds has high risks of toxicity particularly for marine life, if it is chosen to discharge them into the sea, for example in the case of offshore drillings. The deposit of significant amounts of these products on the seabed has led the bordering countries to adopt increasingly strict legislations, forcing the operators of offshore oil drillings, notably in the North sea, to search for products as biodegradable and non-toxic as possible.

In EP 667 890, a drilling fluid is described having a continuous oil phase consisting of a mixture of n-alkanes having between 10 and 20 carbon atoms, essentially free of other types of hydrocarbons. Now, it is noticed that this fluid has a too high pour point for use in a low temperature area, typically less than or equal to 5° C. Esters based on saturated (notably $C_{12}$-$C_{14}$) or unsaturated monocarboxylic acids and on monofunctional alcohols have been proposed as an oil phase in reverse emulsion drilling muds, notably in EP 374 671, EP 374 672 and EP 386 636.

Other synthetic compounds such as PAOs (polyalpha-olefins) or LAOs (linear alpha-olefins), obtained by oligomerization of olefins, may also be used in a mixture with the previous compounds. But these compounds have very poor biodegradability in particular anaerobic biodegradability. Further, the use of all these synthetic products considerably increases the price cost of the drilling fluids into which they are incorporated. EP 1 282 675 proposes a lubricant composition, notably usable as an oil phase of a reverse emulsion drilling fluid, having flow properties and lubricant power suitable for severe conditions of use of this fluid, while preserving quite acceptable biodegradability; this fluid comprises from 60 to 95% by mass of a hydrocarbon mineral cut substantially free of aromatic compounds, the n-paraffin content of which is less than or equal to 10% by weight and the iso-paraffin content is greater than or equal to 35% by weight and 5 to 40% by mass of at least one fatty acid ester which preferably is an ester of 2-ethyl hexanol and rapeseed fatty acids.

The present invention relates to a lubricant composition, notably usable as an oil phase of a drilling fluid, having flow properties and lubricant power particularly well suited to severe conditions of use of this fluid, while preserving its biodegradability comprising a mixture of a major amount of a hydrocarbon mineral cut practically free of aromatic compounds and of a composition consisting in majority of fatty acid(s). For this purpose, the object of the present invention is a biodegradable lubricant composition, based on a hydrocarbon mineral oil and on fatty acid(s) characterized in that it comprises a major amount, comprised between 99.95 and 90% by mass, preferably between 99 and 95% by mass, of a slightly aromatic hydrocarbon oil, preferably non-aromatic oil (an aromatic content measured according to IP391 of less than or equal to 1% by mass, preferably less than or equal to 0.1% by mass), and a minor amount, comprised between 0.05 and 10%, preferably between 1 and 5% by mass, of a composition of in majority saturated and/or unsaturated $C_{16}$-$C_{22}$ monocarboxylic fatty acid(s) optionally in a mixture with resin acids (unsaturated monocarboxylic, polycyclic notably tricyclic, acids).

In the sense of the present invention, by a composition in majority consisting of $C_{16}$-$C_{22}$ monocarboxylic acid(s), is meant any composition for which the concentration of $C_{16}$-$C_{22}$ monocarboxylic fatty acid(s) accounts for 80% to a 100% of the total mass of the composition. Generally, the remainder of the composition comprises monocarboxylic fatty acids, the hydrocarbon chain of which has at least 16 carbon atoms and/or more than 22 carbon atoms. The compositions consisting in majority of $C_{16}$-$C_{22}$ monocarboxylic fatty acid(s) optionally comprise resin acids. The resin acid concentration preferably accounts for up to 10% by mass of the acids (fatty acids+resin acids) of resin acid(s) and advantageously less than 5% of the total mass of the acids (fatty acids+resin acids).

The compositions consisting in majority of $C_{16}$-$C_{22}$ monocarboxylic fatty acids may for example be obtained by hydrolysis of natural and/or genetically modified vegetable oils, of animal fats; mention may be made of the fatty acids derived from peanut, palm, olive, rapeseed, cotton, maize, sunflower, soya bean, flax, tallow oils and/or derived from lard. Among the resin acids, mention may be made of abietic, dihydroabietic, tetrahydroabietic, dehydroabietic, neoabietic, pimaric, levopimaric, parastrinic acids. The compositions consisting in majority of fatty acids and containing resin acids may be obtained by distillation of tall oil, a by-product of the making of wood pulp; and one then refers to TOFA which is the acronym of tall oil fatty acids. TOFAs are for example marketed by TOTAL ADDITIFS & CARBURANTS SPECIAUX under the trade names PC 30, PC 31 and PC 32. In these commercial mixtures, the resin acids generally account for less than 10% by mass and advantageously less than 5% of the total mass of the acids (fatty acids+resin acids). The preferred compositions based on fatty acids are of natural origin, i.e. in the sense of the present invention of vegetable and/or animal origin and not of fossil origin.

The object of the invention is also biodegradable lubricant compositions, based on hydrocarbon oil and ester(s) of glycerol and tall oil fatty acid(s), characterized in that it comprises a major amount, comprised between 99.95 and 90% by mass, preferably between 99 and 95%, of a hydrocarbon mineral oil substantially free of aromatic compounds and a minor amount, comprised between 0.05 and 10% by mass, preferably between 1 and 5%, of a composition in majority of ester(s) of tall oil fatty acid(s) and of glycerol. The ester(s) of tall oil fatty acid(s) and of glycerol may be obtained by esterification of tall oil fatty acid(s) as defined earlier and of glycerol. The slightly or even non-aromatic hydrocarbon oils generally stem from cuts of petroleum products from refineries and the methods for obtaining them generally apply refining methods such as fractionation and purification which allows a reduction in the aromatic level.

The purification typically consists in hydrodesulfurization and/or hydrogenation in order to reduce the sulfur content, in certain cases for removing the sulfur present and reducing or removing the aromatic compounds (de-aromatized oils) and the unsaturated compounds. Conventionally, aliphatic hydrocarbon mineral oils are obtained from virgin petroleum cuts or from cuts from reforming and distillation processes, which have been hydrosulfurized and fractionated beforehand. The de-aromatized mineral oils are obtained from hydrosulfurized, fractionated and hydrogenated products for saturating the aromatics present, hydrogenation may occur before the final fractionation.

The slightly or even non-aromatic hydrocarbon oils may be of mineral origin (from petroleum but also from coal (Coal to Liquid) from gas (Gas to Liquid)) and/or from an animal and/or plant renewable source such as from the biomass (BtL), for example from hydrotreatment and isomerization of esters of vegetable oils. The hydrocarbon oils of the lubricant composition according to the invention generally have boiling temperatures in the range from 220 to 350° C.; mineral oils from cuts having narrower boiling ranges being generally preferred. Preferably, the lubricant compositions according to the invention are liquid at room temperature.

The object of the present invention is therefore to propose lubricant compositions having good biodegradability properties usable as an oil phase in drilling muds, for example as a direct emulsion (o/w) or as a reverse emulsion (w/o). The advantages provided by the compositions according to the invention are of providing a satisfactory compromise between lubricating power and biodegradability, by using them for obtaining a lubricant composition notably incorporated as an oil phase in an drilling fluid, at an optimum cost as compared with that of fluids based on very specific synthetic oils. These compositions also allow savings as regards the price cost of drilling fluids formulated with the latter and maintaining the pour point and the low temperature kinematic viscosity (below 5° C.) at relatively low levels.

Preferably, in the lubricant composition according to the invention is found a hydrocarbon cut, for example of mineral origin, consisting in majority (i.e. of more than 50% by mass) of hydrocarbons having between 13 and 22 carbon atoms. Further, it advantageously has a content of aromatic compounds of less than or equal to 0.1%, and advantageously of less than or equal to 0.01% by mass. The lubricant composition according to the invention generally has a flash point (according to the NF M 07019 method) of greater than or equal to 90° C., preferably greater than or equal to a 100° C. The lubricant composition according to the invention preferably has a kinematic viscosity at 40° C. (according to the NF T 60100 method) comprised between 1.8 and 4 mm²/s and even more advantageously of less than 2.5 mm²/s. The lubricant composition according to the invention has an aerobic biodegradability rate of more than 20% measured according to OECD 306.

Another object of the invention is the use of the lubricant composition according to the invention as defined earlier as a continuous oil phase of a drilling fluid or mud as a reverse emulsion, or as an oil phase dispersed in a continuous aqueous phase; in the case of reverse emulsions, the oil phase generally represents between 60 and 90% by volume of the drilling fluid. The drilling fluid is generally used in combination with functional additives depending on the type of application of the mud. One of the main functional additives of the mud or of the fluid is the weighting agent essentially consisting of barite. Other additives may be used in combination, which are emulsifiers, wetting agents, viscosifiers, filtrate reducing agents, particulate agents for forming gravel filters, supporting agents for maintaining open fractures hydraulically in underground formations, such as calcium carbonate or graphite.

Preferably, the drilling mud or fluid according to the invention comprises from 30% to 95% by mass of the lubricant composition according to the invention as defined earlier and from 5% to 70% of functional additives of said mud. The compositions of these muds vary depending on whether they will be used as a drilling fluid or as a fluid for fracture of underground formations. These drilling muds or fluids are particularly suitable for offshore drillings in deep water. The drilling muds may be prepared for example by mixing at room temperature the various components listed earlier.

It is also possible to prepare a concentrate comprising mineral oil and fatty acids and/or esters of glycerol and fatty acids, as defined earlier containing more than 40% by mass of fatty acids and/or esters of glycerol and fatty acids (and therefore less than 60% by mass of hydrocarbon mineral oil) by mixing these constituents, for example at room temperature, and then during the preparation of the drilling mud or fluid on site, to add the hydrocarbon oil and the other ingredients.

DETAILED DESCRIPTION

Unless indicated otherwise, the amounts and the percentages indicated in the examples below are values by mass.

EXAMPLE 1

5 lubricant compositions were prepared by mixing at room temperature a hydrocarbon mineral oil (distillation range: 250-335° C. (ISO 3405); kinematic viscosity @40° C.: 3.7 (EN ISO 3104); aromatic level: <100 ppm (HPLC); flash point: 115° C. (EN ISO 2719)) marketed by Total Fluides under the name of EDC-11 with one of the 5 additives below in the proportions indicated in Table 1.

ADD 1: PC 32: mixture of fatty acids and of resin acids from TOFA (Tall Oil Fatty Acid) marketed by Total Additifs & Carburants Spéciaux (containing less than 10% of resin acids)

ADD 2: mixtures of TOFA glycerol esters (comprising in majority monoesters)

ADD 3: Naugalube 810 (triethyl citrate) marketed by CHEMTURA

ADD 4: Ultralube II: an alkanolamine marketed by STAVENGER FLUIDS

ADD 5: Versalube: an alkanolamine marketed by MI Swaco

A HFRR (High Frequency Reciprocating Rig) test is conducted in order to evaluate the lubricity of the compositions by resuming the operating conditions of the ISO 12156 standard except for the duration of the test which is set to 120 minutes of friction and the temperature of the test which is room temperature (25° C.). The results are grouped in Table 1.

It is noticed that the additives ADD 2 (according to the invention), ADD 3 and ADD 4 (comparative additives) have a rather similar behavior: with rapid decrease in the diameter of the imprint when the treatment rate increases, so as to obtain a plateau of the order of 200 μm. The preferred additive ADD 1 (according to the invention) is differentiated from the 4 other ones, since its efficiency is much greater for a low treatment level (of the order of 100 ppm).

TABLE 1

| Composition | HFRR WS 1.4 (μm) |
|---|---|
| EDC 95-11 | 532 |
| EDC 95-11 + 40 ppm ADD1 | 526 |
| EDC 95-11 + 100 ppm ADD1 | 216 |
| EDC 95-11 + 500 ppm ADD1 | 186 |
| EDC 95-11 + 1% ADD1 | 157 |
| EDC 95-11 + 3% ADD1 | 178 |
| EDC 95-11 + 100 ppm ADD 2 | 421 |
| EDC 95-11 + 500 ppm ADD 2 | 156 |
| EDC 95-11 + 1% ADD 2 | 159 |
| EDC 95-11 + 3% ADD 2 | 171 |
| EDC 95-11 + 100 ppm ADD 3 | 513 |
| EDC 95-11 + 500 ppm ADD 3 | 167 |
| EDC 95-11 + 1% ADD 3 | 157 |
| EDC 95-11 + 3% ADD 3 | 185 |
| EDC 95-11 + 100 ppm ADD 4 | 519 |
| EDC 95-11 + 500 ppm ADD 4 | 170 |
| EDC 95-11 + 1% ADD 4 | 188 |
| EDC 95-11 + 3% ADD 4 | 183 |
| EDC 95-11 + 100 ppm ADD 5 | 450 |
| EDC 95-11 + 500 ppm ADD 5 | 346 |
| EDC 95-11 + 1% ADD 5 | 195 |
| EDC 95-11 + 1% ADD 5 | 228 |
| EDC 95-11 + 3% ADD 5 | 339 |

EXAMPLE 2

Friction Measurements with a Tribometer with a Ring-Plane Configuration

As for example 1, lubricant compositions are prepared, one containing the additive ADD1 at 1% (according to the invention), or the additive ADD 5 at 1% or 3% (comparatives) and a hydrocarbon mineral oil (distillation range: 220-240° C. (ISO 3405); kinematic viscosity @40° C.: 1.9 (EN ISO 3104); aromatic level: 100 ppm (HPLC); flash point: 92° C. (EN ISO 2719) marketed by Total Fluides under the name of EDC-Pearl, a drilling mud is prepared from this composition. A tribometer with a ring-plane configuration is immersed in the drilling mud, in which tribometer a planar specimen (18*30*7 mm) performing an alternating linear movement at low speed and a cylindrical specimen (radius 35 mm) performing a rotary movement (0.6 m/s), are put into contact, both specimens are in cement steel of the 42 CD4 type and have a mechanical strength comprised between 900 and 1,100 MPa.

The muds are tested at 20° C., 50° C. and then 100° C. They remain in the tribometer during a same series of measurements at these 3 temperatures. During the test, the friction coefficient is recorded versus time, over a period of 250 s. 3 repeatability tests are carried out each time.

The following loading cycle is applied:
at 20° C.: 5 minutes of grinding at 514 MPa; 5 minutes of coefficient measurement at 152 MPa;
7 minutes for attaining 50° C. at 54 MPa; 5 minutes of coefficient measurement at 512 MPa;
10 minutes for attaining 100° C. at 54 MPa; 5 minutes of coefficient measurement at 512 MPa.

The results are grouped in Table 2. It is noticed that with ADD1 it is possible to significantly reduce the friction coefficient of the muds than with ADD 5.

TABLE 2

| Mud containing the composition | Friction coefficient | | |
|---|---|---|---|
| | 20° C. | 50° C. | 100° C. |
| EDC-Pearl + 1% ADD 1 | 0.080 | 0.080 | 0.085 |
| EDC-Pearl + 1% ADD 5 | 0.140 | 0.150 | 0.140 |
| EDC-Pearl + 3% ADD 5 | 0.171 | 0.206 | 0.193 |

EXAMPLE 3

Biodegradability

Aerobic biodegradability tests were only conducted on ADD 1 to 3 and on the hydrocarbon oil EDC 95-11 following the OECD 306 protocol for 7 days and 28 days. The biodegradability results are gathered in Table 3.

TABLE 3

| Aerobic biodegradability test OECD 306 | ADD 1 | ADD 2 | ADD 3 | EDC 95-11 |
|---|---|---|---|---|
| After 7 days (%) | 57 | 48 | 13 | |
| After 28 days (%) | 75 | 64 | 32 | 77 |

It is noticed that the results are excellent for ADD1 and ADD2: the measured biodegradability percentages are considerably larger than certain regulatory requirements of 20%, which is not the case of ADD 3 after 7 days.

EXAMPLE 4

Rheology

The flash point (NF EN ISO 2719), the pour point (ASTM D 7346) and kinematic viscosity @40° C. (NF EN ISO 3104) of lubricant compositions containing 500 ppm, 1% or 3% of additive ADDi are measured and compared with those of the corresponding non-additived hydrocarbon oil. The results are grouped in Table 4.

Repeatabilities of the measurements: for the flash point, the repeatability R is 8-10° C. (R=0.071×the value found during the measurement); for the pour point: the repeatability is 6° C. regardless of the measured value; for the viscosity R=0.082× (value of the measurement+1). It is seen that by incorporating an additive it is possible to slightly increase the value of the flash point of the oil; the pour point is lowered in the presence of ADD 1 and this from the treatment level of 500 ppm.

TABLE 4

| Lubricant composition | Flash point (° C.) | Pour point (° C.) | Kinematic viscosity @40° C. (mm²/s) |
|---|---|---|---|
| EDC 95-11 | 120 | −21 | 3.626 |
| EDC 95-11 + 500 ppm ADD 1 | 123 | −21 | 3.629 |
| EDC 95-11 + 1% ADD 1 | 125 | −24 | 3.676 |
| EDC 95-11 + 3% ADD 1 | 125 | −24 | 3.779 |
| EDC 95-11 + 500 ppm ADD 2 | 121 | −24 | 3.628 |
| EDC 95-11 + 1% ADD 2 | 124 | −21 | 3.686 |
| EDC 95-11 + 3% ADD 2 | 123 | −21 | 3.834 |
| EDC 95-11 + 500 ppm ADD 5 | 118.5 | −31 | 3.678 |
| EDC 95-11 + 1% ADD 5 | 118.5 | −24 | 3.751 |
| EDC 95-11 + 3% ADD 5 | 116.5 | −33 | 3.904 |

For lubricant compositions additived with 1% of ADD 1 and ADD 2 of Table 4, the changes in the kinematic viscosity are evaluated depending on the temperature (NF EN ISO 3104), as well as for a composition additived with 1% ADD3. The results are grouped in Table 5 as well as those of the non-additived corresponding oil.

TABLE 5

| | Kinematic viscosity, mm²/s | | | |
|---|---|---|---|---|
| Temperature (° C.) | EDC 95-11 | EDC 95-11 + 1% ADD1 | EDC 95-11 + 1% ADD2 | EDC 95-11 + 1% ADD3 |
| 0 | 11.47 | 11.72 | 11.74 | 11.45 |
| 10 | 8.003 | 8.154 | 8.161 | 7.953 |
| 20 | 5.910 | 5.994 | 5.998 | 5.879 |
| 30 | 4.510 | 4.582 | 4.593 | 4.486 |
| 40 | 3.569 | 3.622 | 3.614 | 3.555 |
| 50 | 2.903 | 2.950 | 2.938 | 2.894 |
| 60 | 2.412 | 2.445 | 2.465 | 2.403 |
| 70 | 2.06 | 2.083 | 2.071 | 2.035 |
| 80 | 1.768 | 1.782 | 1.778 | 1.752 |
| 90 | 1.542 | 1.552 | 1.550 | 1.530 |
| 100 | 1.355 | 1.369 | 1.370 | 1.349 |

It is seen that the presence of a lubrication additive, in an amount of 1% by mass of the fluid, does not have any impact on the change in viscosity.

Lubricant compositions are prepared with 1% of the ADD 1 to ADD 3 and a hydrocarbon mineral oil (distillation range: 230-270° C. (ISO 3405); kinematic viscosity @40° C.: 2.3 (EN ISO 3104); aromatic content<10 ppm (HPLC); flash point: 100° C. (EN ISO 2719) marketed by Total Fluides under the name of EDC-99 W. The results are grouped in Table 6 as well as those of the non-additived corresponding oil. It is seen that that at high temperatures, the viscosity is not influenced by the presence of a lubrication additive while at lower temperatures, the difference in viscosity between the virgin oil and the additived oil may attain 8%.

TABLE 6

| | Kinematic viscosity, mm²/s | | | |
|---|---|---|---|---|
| Temperature (° C.) | EDC 99 DW | EDC 99 DW + 1% w ADD1 | EDC 99 DW + 1% w ADD2 | EDC 99 DW + 1% w ADD3 |
| 0 | 6.01 | 6.531 | 6.53 | 6.494 |
| 10 | 4.484 | 4.794 | 4.834 | 4.717 |
| 20 | 3.500 | 3.747 | 3.739 | 3.666 |
| 30 | 2.799 | 2.983 | 2.986 | 2.921 |
| 40 | 2.303 | 2.444 | 2.439 | 2.396 |

TABLE 6-continued

| | | Kinematic viscosity, mm$^2$/s | | |
|---|---|---|---|---|
| Temperature (° C.) | EDC 99 DW | EDC 99 DW + 1% w ADD1 | EDC 99 DW + 1% w ADD2 | EDC 99 DW + 1% w ADD3 |
| 50 | 1.937 | 2.047 | 2.045 | 2.008 |
| 60 | 1.654 | 1.743 | 1.741 | 1.709 |
| 70 | 1.446 | 1.507 | 1.505 | 1.481 |
| 80 | 1.261 | 1.330 | 1.316 | 1.300 |
| 90 | 1.125 | 1.168 | 1.164 | 1.157 |
| 100 | 1.005 | 1.047 | 1.043 | 1.030 |

EXAMPLE 5

Stability

In order to evaluate the stability over time of the lubricant compositions containing 1% of ADD 1 and either the oil EDC 95-11 or the oil EDC 99 DWW, each lubricant composition is placed in a 50 mL frusto-conical vial which is left closed at room temperature for several weeks in the laboratory exposed to light. It is checked that the lubricant composition remains stable, homogeneous and does not demix. The observations are grouped in Table 7.

TABLE 7

| | T = 0 | T + 12 days | T + 1 month | T + 2 months |
|---|---|---|---|---|
| EDC 95-11 + 1% ADD1 | Clear and limpid | Limpid No demixing | Limpid No demixing | Limpid No demixing |
| EDC 99 DW + 1% ADD1 | Clear and limpid | Limpid No demixing | Limpid No demixing | Limpid No demixing |

EXAMPLE 6

Friction Tests on the Fann Lubricity Tester

The lubricant compositions are tested for friction on a bench dedicated to oil drilling applications, the fan lubricity tester, so as to appreciate the quality of the different systems in terms of lubricity. Drilling muds are formulated from the lubricant compositions and are then tested on a Fann Lubricity Tester.

The results are grouped in Table 8 below. It is noticed that the additive ADD 3 is not as efficient as ADD 1 and ADD 2.

TABLE 8

| Mud containing the composition | Friction coefficient |
|---|---|
| EDC 95-11 + 100 ppm ADD 1 | 0.085 |
| EDC 95-11 + 500 ppm ADD 1 | 0.082 |
| EDC 95-11 + 3% ADD 1 | 0.072 |
| EDC 95-11 + 100 ppm ADD 2 | 0.084 |

TABLE 8-continued

| Mud containing the composition | Friction coefficient |
|---|---|
| EDC 95-11 + 500 ppm ADD 2 | 0.08 |
| EDC 95-11 + 3% ADD 2 | 0.072 |
| EDC 95-11 + 500 ppm ADD 3 | 0.088 |
| EDC 95-11 + 3% ADD 3 | 0.088 |
| EDC 95-11 + 500 ppm ADD 5 | 0.084 |
| EDC 95-11 + 3% ADD 5 | 0.076 |
| EDC 95-11 + 100 ppm ADD5 | 0.088 |

The invention claimed is:

1. A drilling fluid comprising, as an oil phase, a lubricant composition having an aerobic biodegradability rate of more than 20% measured according to OECD 306, said lubricant composition being based on a hydrocarbon mineral oil and on tall oil fatty acid(s), the lubricant composition comprising:
  between 99.95 and 90% by weight of a hydrocarbon oil having:
    a boiling temperature in the range from 220 to 350° C.;
    an aromatic content measured according to IP 391 of less than or equal to 1% by mass;
    a kinematic viscosity at 40° C. according to NF T 60100 method comprised between 1.8 and 4 mm$^2$/s; and
  between 40 ppm and 10% by weight of a composition comprising from 80 to 100% by weight of tall oil fatty acid(s).

2. The drilling fluid of claim 1, comprising between 99 and 95% by weight of the hydrocarbon oil.

3. The drilling fluid of claim 1, comprising between 40 ppm and 5% by weight of the composition comprising from 80 to 100% by weight of tall oil fatty acid(s).

4. The drilling fluid of claim 1, as a mixture with resin acids.

5. The drilling fluid of claim 1, wherein the aromatic content of the hydrocarbon oil is less than or equal to 0.1% by mass.

6. The drilling fluid of claim 1, wherein the hydrocarbon oil is free of aromatics.

7. The drilling fluid according to claim 1, wherein the hydrocarbon oil is of mineral origin (from petroleum and/or from coal (Coal to Liquid) and/or from gas (Gas to Liquid)) and/or from a renewable animal and/or plant source.

8. The drilling fluid of claim 7, wherein the hydrocarbon oil is from biomass (BTL).

9. The drilling fluid of claim 8, wherein the hydrocarbon oil is from the hydrotreatment and isomerization of vegetable oil esters.

10. The drilling fluid according to claim 1, for very deep drillings.

11. The drilling fluid according to claim 10, wherein the deep drillings are offshore in deep water and/or sidetracked drillings and/or with a long shift.

12. The drilling fluid according to claim 3, further comprising between 140 ppm and 3% by weight of the composition comprising from 80 to 100% by weight of tall oil fatty acid(s).

* * * * *

UNITED STATES PATENT AND TRADEMARK OFFICE
CERTIFICATE OF CORRECTION

PATENT NO. : 8,846,583 B2
APPLICATION NO. : 13/516325
DATED : September 30, 2014
INVENTOR(S) : Bernard Jean-Luc Espagne et al.

Page 1 of 1

It is certified that error appears in the above-identified patent and that said Letters Patent is hereby corrected as shown below:

On the title page, Column 1, Inventors, delete "Hél éne" and insert therefor: -- Hélené --.

On the title page, Column 1, Inventors, delete "Lyons" and insert therefor: -- Lyon --.

Signed and Sealed this
Third Day of February, 2015

Michelle K. Lee
*Deputy Director of the United States Patent and Trademark Office*